Aug. 28, 1962  P. MARTIN  3,051,198
SERVO-ASSISTED SHUT-OFF DEVICE
Filed Jan. 19, 1960
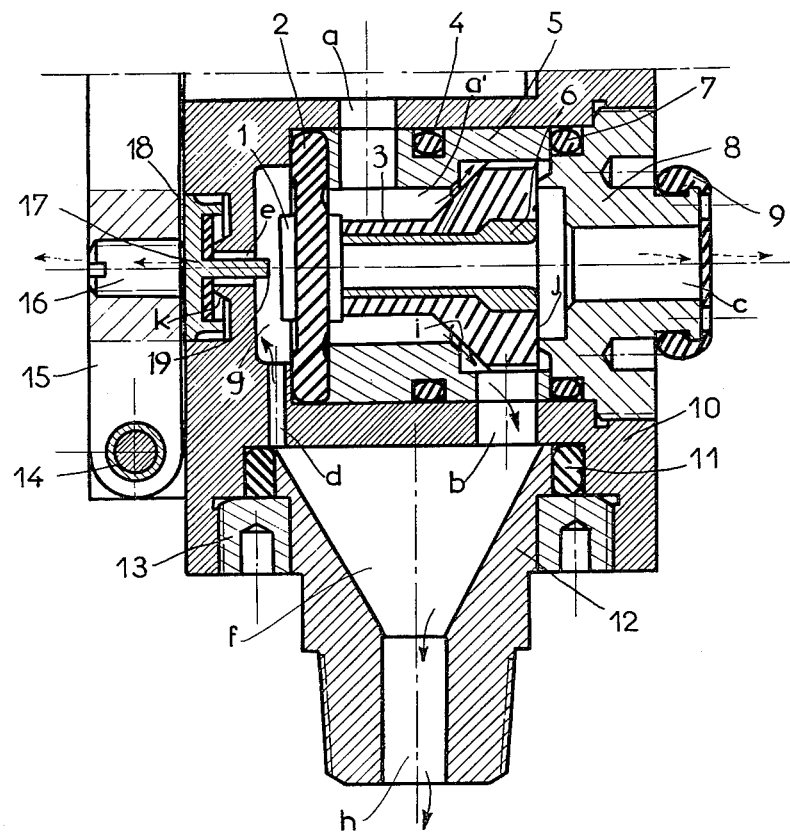
INVENTOR
PIERRE MARTIN
BY Craig and Freudenberg
ATTORNEYS 3,051,198
SERVO-ASSISTED SHUT-OFF DEVICE
Pierre Martin, Houilles, France, assignor to Compagnie Parisienne d'Outillage a Air Comprime, Paris, France
Filed Jan. 19, 1960, Ser. No. 3,283
Claims priority, application France Feb. 27, 1959
13 Claims. (Cl. 137—625.27)

Pneumatic shut-off devices comprising a pilot member such as the conventional electromagnetic valves having a plunger core require, for correct functioning, the limitation of air throughflow apertures to very small diameters generally less than 2 mm. Furthermore, the closing of these devices is in most cases effected by mechanical springs which, with use, are liable to develop defects in operation.

The object of the present invention is to obviate these disadvantages whilst requiring only a very slight operating force to be applied, and permitting very high rates of working to be achieved. This invention relates to a servo-assisted shut-off device, characterised in that it comprises: a primary pressure chamber connected by an aperture to a pressure-fluid inlet; a deformable diaphragm constituting at least partly one wall of the primary pressure chamber; a pin which is fixed to one point of the diaphragm and on which is mounted a mobile valve member which is movable between a first seat through one wall of the chamber and a second seat debouching on a discharge aperture; a compression chamber connected on the one hand to a fluid outlet duct towards a receiving apparatus and on the other hand to the primary pressure chamber by the first seat or to the discharge aperture by the second seat; a reaction chamber one wall of which is constituted at least partly by the diaphragm and which is situated at the side of the diaphragm opposite from the primary pressure chamber; a reaction duct whereby the reaction chamber communicates with the compression chamber; a push rod operatable from the exterior of the device and penetrating through an aperture into the reaction chamber so as to be capable of pressing on the end of the pin fixed to the diaphragm and lifting the mobile valve member from its first seat.

Other features of the invention will be brought out from the following description of the example of embodiment and the accompanying drawing whose single FIGURE represents a sectional view of a shut-off device according to the invention.

The body 10 of the device comprises a cylindrical bore closed by a screw-threaded plug 8 through which a discharge aperture c extends. This bore comprises near the end opposite to the plug 8 a shoulder against which an elastic diaphragm 2 made of vulcanised rubber is gripped by its edges between the shoulder and a cylindrical brass liner 5 which is clamped at its other end by the screw-threaded plug 8, with interposition of a sealing ring 7.

The plug 8 comprises at its inner face a valve seat j surrounding the venting orifice or pressure relieving duct c. A valve seat i situated opposite is formed by a shoulder of the cylindrical liner 5.

The elastic diaphragm 2 is vulcanised to a metal pin 1 which is situated co-axially in the bore. A brass sleeve 6 is clamped on the portion of the pin 1 at the end adjacent the liner 5. This sleeve is used for fixing on the pin 1 a valve member 3 which has been previously vulcanized on the sleeve. The diaphragm 2, pin 1 and valve member 3 define a displaceable valve structure at least part of which forms a separator wall between a primary pressure chamber $a'$ and a reaction chamber $g$ to be discussed in detail hereinafter. This valve member comprises a conical face situated in front of the seat $i$ and a plane face situated facing the seat $j$.

For connection to a suitable source of pressure fluid the housing or body of the shut-off or valve device has a compressed air inlet aperture $a$ which extends through the body of the device and the cylindrical liner 5 between the diaphragm 2 and the seat $j$ and opens into the primary pressure chamber $a'$.

A connection piece 12 provided with gaspipe screw-threading and with an aperture $h$ for the outlet of pressurised air towards a receiving apparatus transmitting or using the pressurized medium is mounted on the body of the device by means of a lock nut 13 with interposition of a toroidal packing ring 11. A conical compression chamber $f$ is formed within the connection piece 12 and an aperture $b$ extending through the body 10 and the liner 5 between the valve seats $i$ and $j$ establishes communication between chamber $f$ and these valve seats, thus defining, on the one hand, passage means between chambers $f$ and $a'$ or, on the other hand, passage means between the chambers $f$ and the pressure relieving discharge ducts $c$, these passages being selectively and alternately closed depending upon the position of the displaceable valve structure which includes the valve member 3.

The chamber formed at the side of the diaphgram 2 opposite to the valve 3 constitutes the reaction chamber $g$ which communicates with the chamber $f$ by way of a duct $d$, thus interconnecting chambers $a'$ and $g$ when the valve is opened at seat $i$ to permit the pressure in chamber $g$ to generally equal that in chamber $a$ when a valved aperture $e$, described hereinafter, is closed.

A toroidal packing ring 4 situated about the liner 5 between the apertures $a$ and $b$ is interposed between the liner and the body of the device.

The face of the chamber $g$ opposite to the diaphragm 2 is constituted by the body of the device 10. Through this face there extends the valved aperture $e$ which is co-axial with the pin 1 and debouches at the centre of a cylindrical housing on the outer face of the body of the device to relieve the pressure of chamber $g$ when aperture $e$ is open.

The shut-off device includes a control valve 17 for closing aperture $e$ and carrying a push rod 19 engageable with the pin 1 to actuate the latter toward the illustrated position when the valve 17 is moved to its closed position. The push rod 19 penetrates into the chamber $g$ through an aperture $e$ and is fast with the cylindrical discharge valve 17 which guides the push rod coaxially with the pin 1, sliding in the manner of a piston in the cylindrical housing at the outer face of the body of the device. The piston thus formed by the valve 17 is hollow as recessed and comprises a disc 18 made of elastic rubber on the plane face opposite to the bottom of the cylindrical housing, the said bottom comprising a valve seat $k$ about the aperture $e$.

The cylindrical outer face of the valve member 17 comprises longitudinal grooves over a portion of its height from the bottom of the cylindrical housing, so that when the valve member 17 is slightly lifted, the grooves are unmasked and put the discharge aperture $e$ in communication with the atmosphere.

The displacement of the push rod 19 can be effected manually or can be carried out by any mechanical, electrical or pneumatic means. In the example of embodiment illustrated here, the push rod is fixed to a point on a control lever 15 which is pivotally mounted on a pin 14. It is mounted by means of an adjusting screw 16 which is fast with the push rod and is screwed through the lever.

In order to prevent dust from being able to penetrate into the device through the discharge duct $c$, the discharge plug 8 comprises a dust seal 9 formed by an elastic rubber diaphragm provided with apertures arranged so as to be unmasked as soon as the diaphragm is lifted by outgoing air.

This device operates in the following manner: The primary air arrives through the aperture $a$ into the annular primary pressure chamber $a'$ whose walls are constituted by the diaphragm 2, the liner 5 and the valve member 3. The outer diameter of the diaphragm is larger than the diameter of the seat $i$. Therefore, assuming aperture $e$ to be open, the mobile assembly (diaphragm and valve member), under the action of the pressure of the fluid tends to close the valve passage at the seat $i$, irrespective of the value of the pressure of the fluid.

Furthermore, the diaphragm is slightly pre-tensioned at the time of assembly in order to effect obturation mechanically even in the absence of the fluid.

In order to open the device at seat $i$ and close it at seat $j$, it is sufficient to exert a relatively slight operating force on the lever 15 to actuate valve 17 to close aperture $e$, for example by means of an electro-magnet of which the lever 15 constitutes the armature.

The length of the push rod 19 is so determined that when the discharge valve 17 is applied against its seat $k$, slightly compressing the elastic disc 18, the end of the rod 19 bears against the pin 1, causing a slight displacement just sufficient to lift the valve member 3 from its seat $i$. The fluid then flows through the aperture $b$ into the compression chamber $f$ which has a sufficient volume to permit the establishment therein of a counter-pressure as near as possible to the primary air pressure at the inlet of the device. For this purpose the chamber $f$ has been given a conical shape in order to promote this result.

The fluid penetrates through the duct $d$ from the chamber $f$ to the reaction chamber $g$ where it exerts pressure on the diaphragm. The air pressures at the two faces of the diaphragm are generally equal and balanced out. The force exerted by the primary pressure on the valve member 3 is then predominant and the latter is repelled against its seat $j$.

During the short interval of time during which the valve member 3 passes from its seat $i$ to its seat $j$, the fluid passes through the discharge seat $j$, but the force exerted by the air pressure on this face of the valve member 3 is much lower than that of the primary pressure on the opposite face and cannot oppose operation, owing to the loss of pressure undergone by the fluid under pressure as it passes between the plane face of the valve member 3 and the seat $j$.

The length of the rod 19 is such that at the end of the travel of the valve member 3 against the seat $j$, the end of the pin 1 is no longer in contact with this rod.

The discharge seat $j$ being shut, it is sufficient to maintain on the control lever 15 a very slight force in order to keep the disc 18 of the discharge valve 17 on its seat $k$ and to balance the force exerted by the reaction pressure in chamber $g$ on valve 17 through the annular opening $e$ and on the rod 19. The reaction pressure thus maintained in the chamber $g$ is sufficient to keep the valve member 3 open at seat $i$.

As soon as this force on the control lever 15 is removed, the force exerted by the reaction pressure on the central portion of the disc 18 lifts the latter away from its seat $k$. The reaction pressure is at once exerted on the entire surface of the valve member 17 and lifts it very quickly to free its lateral grooves which connect the chamber $g$ with the atmosphere. It will be noted that the diameter of the aperture $e$ is sufficiently large for the annular cross-section about the rod 19 to be larger than the cross-section of the duct $d$ through which the air enters the reaction chamber, so that the discharge of this chamber $g$ is effected without delay and at a faster rate than pressure medium is available through duct $d$.

The air pressure is then exerted only on the face of the diaphragm 2 opposite the valve member 3, and thus the latter is applied against the seat $i$ having been lifted away from the seat $j$. The chamber $f$ and the receiving apparatus connected to the aperture $h$ are then put in communication with the discharge duct $c$.

This device makes it possible to obtain much larger cross-sections of passage than those normally achieved with servo-assisted shut-off devices. The smallest cross-section of passage for the air in the device can be larger than 10 mm.$^2$, using a balanced pneumatic assembly without any mechanical restoring spring.

In addition, the fluid is also used in a positive reaction process in order to assist positional stability, and to ensure excellent closing of the discharge aperture $c$ during the period of delivery.

When an electromagnet is used to act on the control lever, it can be of low power without any risk of strain since after the first impulse the force required to keep the lever in position is even less than the force used in the first impulse.

What is claimed is:

1. A servo-assisted shut-off device comprising: means defining a primary pressure chamber having an aperture forming a pressure fluid inlet thereto; a deformable diaphragm constituting at least partly one wall of the primary pressure chamber; valve means including a mobile valve member secured to said diaphragm, a first seat at one wall of the chamber and a second seat debouching on a discharge aperture, said valve member being alternately engageable with said seats; means defining a compression chamber having a fluid outlet duct toward a receiving apparatus; fluid passage means connecting said compression chamber through said valve means to the primary pressure chamber by way of the first seat and to the discharge aperture by way of the second seat; means defining a reaction chamber one wall of which is constituted at least partly by the diaphragm, said reaction chamber being situated at the side of the diaphragm opposite from the primary pressure chamber; a reaction duct interconnecting the reaction chamber with the compression chamber; means defining a pressure relieving aperture in a wall of said reaction chamber; control valve means for closing said reaction chamber aperture; and actuator means operable from the exterior of said device for moving the mobile valve member secured to the diaphragm to lift the valve member from said first seat.

2. A shut-off device according to claim 1 wherein said actuator means includes an actuator extending into said reaction chamber through the wall thereof.

3. A shut-off device according to claim 2, wherein the aperture traversed by said actuator provides a fluid passage having an annular cross section larger than the cross section of the reaction duct to permit discharge of fluid from the reaction chamber without delay.

4. A shut-off device according to claim 2, wherein said actuator extends through the pressure relieving aperture in the wall of said reaction chamber.

5. A shut-off device according to claim 4, wherein the aperture through which the actuator extends is of sufficiently large cross section to provide a fluid discharge passage from the reaction chamber, and wherein said control valve means includes a valve member secured to said actuator.

6. A shut-off device according to claim 5, wherein said actuator is a push rod and said last-mentioned valve member is situated opposite a valve seat arranged adjacent the reaction chamber aperture on an outer face of the device.

7. A shut-off device according to claim 5, wherein said aperture has a cylindrical outer end and said control valve means includes a second valve member slidable in said aperture and secured to said first-mentioned valve member, the second valve member being of cylindrical form and comprising a cylindrical face having groove means over part of its height and cooperating with the cylindrical end portion of said aperture so that said groove means are blocked when the second valve member is moved to a predetermined position in its receiving aperture, said groove means providing relief of pressure from said reaction chamber through the relief aperture when the second valve member is lifted to a second position in said relief aperture.

8. A shut-off device according to claim 5, including a lever and means for pivoting said lever on said device, and means including an adjusting screw for connecting said lever to said push rod for actuating the latter.

9. A shut-off device according to claim 1, wherein the effective exposed surface area at the diaphragm in the primary pressure chamber is greater than that at the said first seat to provide a net force of pressure fluid in said primary pressure chamber on said diaphragm and said mobile valve member tending to hold the latter against said first seat.

10. A shut-off device according to claim 1, wherein the compression chamber is of sufficient volume for the fluid pressure therein to approximately equal the primary pressure when said valve means is open at said first seat and the fluid is delivered by way of the outlet duct toward the receiving apparatus.

11. A shut-off device according to claim 10, wherein the compression chamber is in the form of a cone at whose apex there debouches the duct for the outlet of fluid toward the receiving apparatus.

12. A shut-off device according to claim 1, including means for mounting the diaphragm in a position and with slight tension so predetermined as to bias the valve member to engage said first seat.

13. A shut-off device according to claim 1, wherein said primary pressure chamber and said reaction chamber have coaxial cylindrical walls and said diaphragm extends generally transversely of the axis of said walls, said pressure relieving aperture for said reaction chamber being located along said axis, and said actuator means extending through said pressure relieving aperture and carrying said control valve means.

References Cited in the file of this patent

UNITED STATES PATENTS

| | | |
|---|---|---|
| 412,327 | Gibson | Oct. 8, 1889 |
| 2,336,887 | Piron | Dec. 14, 1943 |
| 2,460,908 | Scott | Feb. 8, 1949 |
| 2,587,357 | McPherson | Feb. 26, 1952 |
| 2,913,005 | Grant | Nov. 17, 1959 |